US009312762B2

(12) United States Patent
Arai et al.

(10) Patent No.: US 9,312,762 B2
(45) Date of Patent: Apr. 12, 2016

(54) CONTROL CIRCUIT FOR STEP-UP DC/DC CONVERTER

(71) Applicant: ROHM CO., LTD., Kyoto (JP)

(72) Inventors: Kenji Arai, Kyoto (JP); Noriaki Hiraga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 61 days.

(21) Appl. No.: 14/230,531

(22) Filed: Mar. 31, 2014

(65) Prior Publication Data

US 2014/0312863 A1    Oct. 23, 2014

(30) Foreign Application Priority Data

Mar. 29, 2013   (JP) ................................ 2013-073355

(51) Int. Cl.
| | |
|---|---|
| *H02M 1/00* | (2007.01) |
| *H02M 1/08* | (2006.01) |
| *H02M 3/156* | (2006.01) |
| *H02M 3/158* | (2006.01) |

(52) U.S. Cl.
CPC ...... *H02M 3/156* (2013.01); *H02M 2001/0045* (2013.01)

(58) Field of Classification Search
CPC ............ H02M 2001/0029; H02M 2001/0045; H02M 1/08; H02M 3/156; H02M 3/158
USPC .................................. 323/271, 272, 282, 285
See application file for complete search history.

(56) References Cited

U.S. PATENT DOCUMENTS

| | | | | |
|---|---|---|---|---|
| 5,936,439 | A * | 8/1999 | Pollersbeck | 327/110 |
| 6,421,262 | B1 * | 7/2002 | Saxelby et al. | 363/127 |
| 2010/0284204 | A1 * | 11/2010 | Mayell | 363/37 |
| 2012/0242305 | A1 * | 9/2012 | Goto | 323/271 |
| 2012/0326632 | A1 * | 12/2012 | Kitagawa | 315/307 |
| 2013/0038307 | A1 * | 2/2013 | Saito et al. | 323/283 |

FOREIGN PATENT DOCUMENTS

JP         2009055708 A        3/2009

OTHER PUBLICATIONS

JP (2009-055708A) Dec. 3, 2009 ,Hara Kiyohito, Switching regulator and DC-DC conversion device uising the switching regulator.*

* cited by examiner

*Primary Examiner* — Timothy J Dole
*Assistant Examiner* — Sisay G Tiku
(74) *Attorney, Agent, or Firm* — Cantor Colburn LLP

(57) ABSTRACT

A switching transistor is configured such that its on resistance $R_{ON}$ is switchable between at least two values $R_{ON1}$ and $R_{ON2}$. When the switching transistor is switched from off to on, a control circuit sets the on resistance of the switching transistor to the first value $R_{ON1}$ for a first period immediately after the switching of the switching transistor. Subsequently, for a second period until the switching transistor is turned off, the control circuit sets the on resistance of the switching transistor to the second value $R_{ON2}$ that is smaller than the first value $R_{ON1}$.

20 Claims, 13 Drawing Sheets

IN T$_{RR}$ PERIOD

AFTER T$_{RR}$ PERIOD

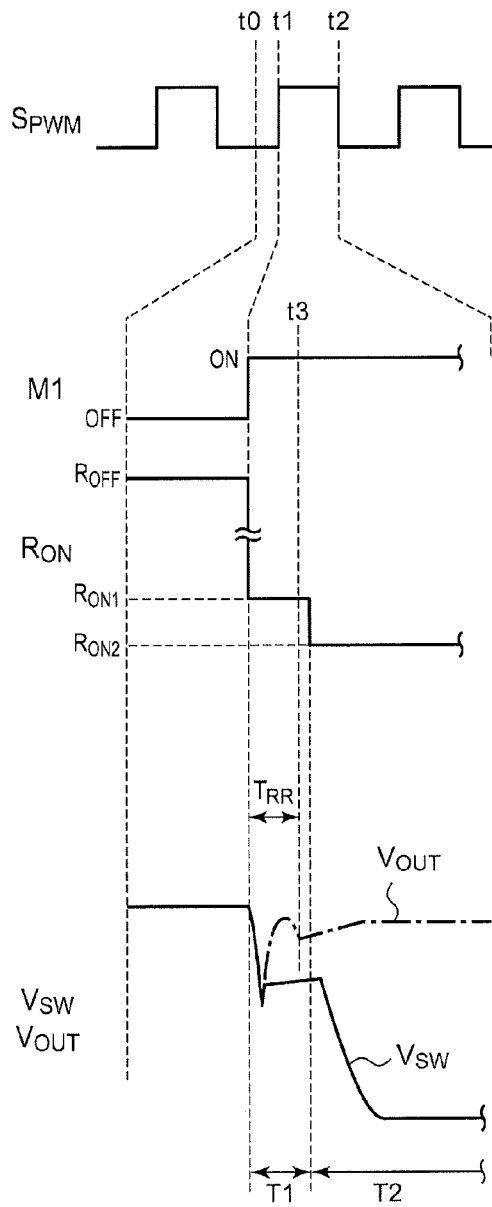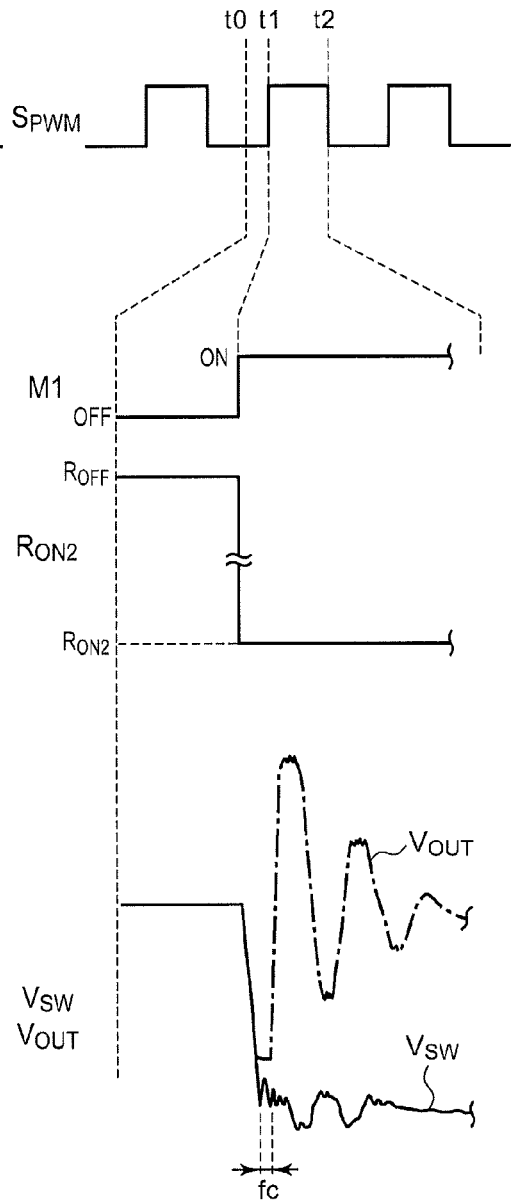

CONTROL CIRCUIT FOR STEP-UP DC/DC CONVERTER

CROSS-REFERENCE TO FOREIGN PRIORITY

The present invention claims priority under 35 U.S.C. §119 to Japanese Application No. 2013-073355 filed Mar. 29, 2013, the entire content of which is incorporated herein by reference.

BACKGROUND OF THE INVENTION

1. Field of the Invention

The present invention relates to a step-up DC/DC converter.

2. Description of the Related Art

In order to generate a voltage that is higher than the input voltage, a step-up DC/DC converter (switching regulator) is employed. FIG. 1 is a circuit diagram showing a typical configuration of a step-up DC/DC converter 100r. The step-up DC/DC converter 100r includes an inductor L1, an output capacitor C1, a switching transistor M1, a rectifier diode D1, and a control circuit 2r.

The control circuit 2r is configured in the form of a package, which is mounted on a common printed circuit board (PCB) on which the inductor L1, the rectifier diode D1, and the output capacitor C1 are also mounted. The switching transistor M1 is integrated on a semiconductor chip 4 included in the control circuit 2r.

The voltage (output voltage) $V_{OUT}$ at the output terminal $P_{OUT}$ is divided by resistors R1 and R2, and the voltage thus divided is fed back to a voltage detection terminal VS of the control circuit 2r. The control circuit 2r controls the switching of the switching transistor M1 such that the feedback voltage $V_S$ approaches a predetermined target voltage $V_{REF}$.

The semiconductor chip 4 included in the control circuit (package) 2r includes a pulse modulator 10, a driver 12, and a transmission path 14, in addition to the switching transistor M1.

The pulse modulator 10 adjusts the duty ratio of the pulse signal $S_{PWM}$, i.e., its output signal, such that the feedback voltage $V_S$ approaches the predetermined target voltage $V_{REF}$. The driver 12 drives the switching transistor M1 according to the pulse signal S. Related techniques have been disclosed in Japanese Patent Application Laid Open No. 2009-55708, for example.

The present inventors have investigated the DC/DC converter 100r shown in FIG. 1, and have come to recognize the following problem.

In the DC/DC converter 100r shown in FIG. 1, there are parasitic inductances $L_{PKG1}$ and $L_{PKG2}$ within the control circuit 2r configured as a semiconductor package, and there is a parasitic inductance $L_{SUB}$ and a parasitic resistance $R_{SUB}$ on the printed circuit board mounting the control circuit 2r.

In the off period of the switching transistor M1, the rectifier diode D1 is biased in the forward direction by means of the electromotive force generated by the coil. In this state, charge is accumulated in the rectifier diode D1. Subsequently, after the switching transistor M1 transits to on, the charge stored in the rectifier diode D1 flows toward the switching transistor M1 due to the reverse recovery property of the rectifier diode D1. The charge flows to the ground of the printed circuit board via the switching transistor M1. That is to say, during the reverse recovery time $T_{RR}$ of the rectifier diode, the rectifier diode D1 can be regarded as a capacitance $C_{OJ}$.

Thus, during the reverse recovery time $T_{RR}$, a loop including the output capacitor C1, the rectifier diode D1, the switching transistor M1, and the ground line forms a series RLC resonance circuit. It should be noted that the capacitance value of the output capacitor C1 is sufficiently large as compared with the capacitance $C_{OJ}$ of the rectifier diode D1. Thus, with such a series connection with the rectifier diode D1, the effect of the capacitance value of the output capacitor C1 is negligible.

In the on state of the switching transistor M1, ideally, the voltage (which is also referred to as the "switching voltage) $V_{SW}$ at the switching (SW) terminal is 0 V. However, in some cases, immediately after the transition to the on state, the switching voltage $V_{SW}$ and the output voltage $V_{OUT}$ oscillate at a resonance frequency $\omega_o = 1/\sqrt{(LC)}$ [rad] of the RLC resonance circuit.

$$L \approx L_{PKG1} + L_{PKG2} + L_{SUB}$$

$$C \approx C_{OJ}$$

The oscillation of the switching voltage $V_{SW}$ and/or the output voltage $V_{OUT}$ is emitted to the outside in the form of electromagnetic noise. Thus, in a case in which the resonance frequency $\omega_o$ is within a frequency band to be controlled as specified by an EMI standard, an EMI countermeasure must be applied. Typical examples of conceivable EMI countermeasures include: a method in which the circuit is covered by an electromagnetic shielding material; a method in which the value of the inductor L1 is adjusted; and the like. However, such methods lead to an increased cost, and require such adjustments to be repeatedly performed by means of a trial and error approach.

SUMMARY OF THE INVENTION

The present invention has been made in order to solve such a problem. Accordingly, it is an exemplary purpose of an embodiment of the present invention to provide a technique for suppressing oscillation and ringing in the switching voltage $V_{SW}$ and the output voltage $V_{OUT}$ for the reverse recovery time $T_{RR}$ of a rectifier diode D1.

An embodiment of the present invention relates to a control circuit for a step-up DC/DC converter. The step-up DC/DC converter comprises an inductor, a rectifier diode, an output capacitor, and a switching transistor. The switching transistor is configured such that its on resistance is switchable between at least two values. The control circuit is configured such that, when the switching transistor is switched from off to on, the control circuit sets the on resistance of the switching transistor to a first value for a first period immediately after the switching of the switching transistor, following which the control circuit sets the on resistance of the switching transistor to a second value that is smaller than the first value for a second period until the switching transistor is turned off.

During the reverse recovery time immediately after the switching transistor is turned on, an RLC resonance circuit comprising the capacitance component of the rectifier diode is formed. In this state, a current discharged from the capacitance component $C_{OJ}$ of the rectifier diode flows through the RLC resonance circuit, whereby resonance can occur. Here, the attenuation coefficient ξ of the series RLC circuit is represented by the following Expression.

$$\xi = R/(2\sqrt{(L/C)})$$

In the first period, which overlaps the reverse recovery time, the on resistance of the switching transistor is set to a first value which is relatively high, thereby raising the attenuation coefficient ξ. Thus, such an arrangement is capable of suppressing resonance. Alternatively, even if resonance occurs, such an arrangement is capable of settling the resonance in a short period of time by means of strong damping.

Also, the first period may be configured to have a length which is equal to or otherwise greater than the reverse recovery time of the rectifier diode.

In a case in which the first period is shorter than the reverse recovery time, the reverse recovery time continues even after the first period ends. With such an arrangement, when the on resistance of the switching transistor is switched to the second value, which is relatively low, after the first period has ended, in some cases, the relation $\xi<1$ holds true, which satisfies the condition for resonance. In this state, if the resonance energy in the resonance circuit is not sufficiently damped in the first period, there is a risk of oscillation in the switching voltage or the output voltage.

With the embodiment, the first period is set to a length which is equal to or greater than the reverse recovery time, thereby preventing oscillation in the switching voltage and the output voltage in a sure manner.

Also, with the series resistance component of a loop comprising the output capacitor, the rectifier diode, the switching transistor, and a ground line as R, with the capacitance component of this loop as C, and with the series inductance component of this loop as L, the first value may be determined such that the relation $R/(2\times\sqrt{(L/C)})>1$ is satisfied.

In this case, the condition for resonance is not satisfied, thereby suppressing oscillation and ringing in the switching voltage and the output voltage.

In order to avoid resonance at a predetermined frequency fc, with the series resistance component of a loop comprising the output capacitor, the rectifier diode, the switching transistor, and a ground line as R, and with the capacitance component of this loop as C, the first value may be determined such that the relation $R=1/(\pi\times fc\times C))$ is satisfied.

Even in a case in which it is difficult to estimate the inductance value, such an arrangement is capable of suppressing oscillation and ringing in the switching voltage and the output voltage at a predetermined frequency fc.

Also, the control circuit may be configured to be capable of adjusting the length of the first period according to the reverse recovery time of the rectifier diode.

Also, the control circuit may be configured to be capable of adjusting the first value according to the capacitance value of the rectifier diode.

Also, the switching transistor may comprise multiple transistor elements connected in parallel such that their control terminals are arranged independently. Also, the control circuit may be configured to switch the on-state transistor element according to switching between the first period and the second period, thereby switching the on resistance of the switching transistor corresponding to a combined resistance of the multiple switching elements.

Also, the control circuit may comprise: a pulse modulator configured to generate a pulse signal having a duty ratio adjusted such that a feedback voltage that corresponds to an output voltage of the step-up DC/DC converter approaches a predetermined target voltage; a first driver configured to drive a first transistor element configured as a transistor element which is to be turned on for at least the first period, on the basis of the pulse signal; and a second driver configured to drive a second transistor element configured as a transistor element which is to be turned on only for the second period, on the basis of the pulse signal.

Such an arrangement allows the first value and the second value of the on resistance to be designed based on the size and the gate-source voltage of each of the first transistor element and the second transistor element.

Also, the control circuit may further comprise a variable delay circuit configured to apply, to a gate pulse signal to be supplied to the second transistor element, a delay that is adjustable according to the reverse recovery time of the rectifier diode that is actually employed.

This allows the length of the first period to be optimized according to the reverse recovery time.

Also, the control circuit may further comprise a driving adjustment circuit configured to adjust the on resistance of the first transistor element according to the capacitance of the rectifier diode that is actually employed.

This allows the first value of the on resistance to be optimized according to the capacitance of the rectifier diode.

Also, the driving adjustment circuit may be configured to change the amplitude (high level voltage) of a gate pulse signal to be supplied to a control terminal of the first transistor element.

Also, the control circuit may further comprise a register configured to store data which represents at least one from among the reverse recovery time and the capacitance of the rectifier diode that is actually employed, or otherwise an external setting terminal configured to allow settings to be made for at least one from among the reverse recovery time and the capacitance of the rectifier diode that is actually employed.

Also, the control circuit may further comprise a capacitance detection circuit configured to detect the capacitance $C_{OJ}$ of the rectifier diode by integrating a current that flows when the switching transistor is turned on after the rectifier diode is charged using a predetermined voltage.

After the switching transistor is turned off, the capacitance component $C_{OJ}$ is charged according to the voltage difference $\Delta V$ between the current input voltage and the current output voltage. In this case, the charge amount Q stored in the capacitance $C_{OJ}$ is represented by the following Expression.

$$Q = C_{OJ} \cdot \Delta V$$

Subsequently, when the switching transistor M1 is turned on, the discharge current flows through the switching transistor M1. By integrating the discharge current, such an arrangement is capable of calculating the charge amount Q. When the voltage difference $\Delta V$ is a known value, such an arrangement is capable of calculating the capacitance $C_{OJ}$ of the rectifier diode.

Also, the control circuit may further comprise a time measurement circuit configured to detect the reverse recovery time of the rectifier diode based on the waveform of a current that flows when the switching transistor is turned on after the rectifier diode is charged using a predetermined voltage.

Also, the control circuit may monolithically be integrated on a single semiconductor chip. Also, the switching transistor may monolithically be integrated on the control circuit.

Examples of such a "monolithically integrated" arrangement include: an arrangement in which all the circuit components are formed on a semiconductor chip; and an arrangement in which principal circuit components are monolithically integrated. Also, a part of the circuit components such as resistors and capacitors may be arranged in the form of components external to such a semiconductor chip in order to adjust the circuit constants. By integrating the circuit in the form of a single IC, such an arrangement provides an advantage of a reduced circuit area, and an advantage of maintaining uniform circuit element characteristics.

Another embodiment of the present invention relates to a step-up DC/DC converter. The step-up DC/DC converter comprises: an inductor having one end via which an input voltage is to be applied; a switching transistor arranged between a second end of the inductor and a ground line; a rectifier diode having an anode connected to the second end of the inductor; an output capacitor arranged between a cathode of the rectifier diode and the ground line; and the aforementioned control circuit configured to perform switching of the switching transistor.

Yet another embodiment of the present invention relates to an electronic device. The electronic device comprises the aforementioned switching power supply.

Yet another embodiment of the present invention relates to a vehicle. The vehicle comprises: a battery; and the aforementioned switching power supply configured to step up the voltage supplied by the battery.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A is a waveform diagram showing the operation of a control circuit, and FIG. 5B is a waveform diagram showing the operation of the control circuit shown in FIG. 1;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

[Concept]

Figure 2:
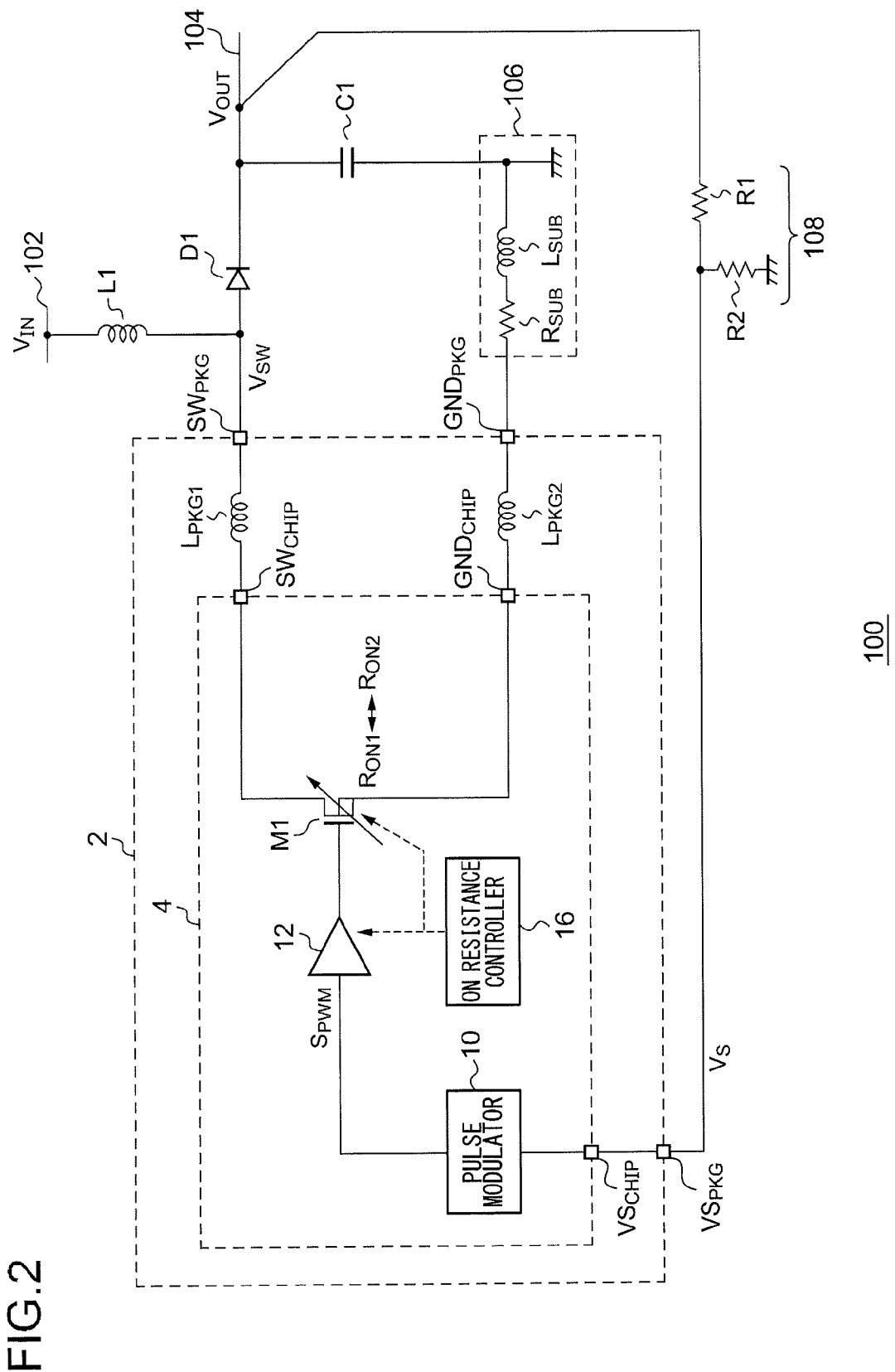
FIG. 2 is a circuit diagram showing a schematic configuration of a step-up DC/DC converter according to an embodiment.

FIG. 2 is a circuit diagram showing a schematic configuration of a step-up DC/DC converter (which will also be referred to simply as the "DC/DC converter" hereafter) 100. The DC/DC converter 100 steps up the input voltage $V_{IN}$ input via an input line 102, and supplies, to a load (not shown) connected to an output line 104, an output voltage $V_{OUT}$ stabilized to the target level.

The DC/DC converter 100 includes an inductor L1, a switching transistor M1, a rectifier diode D1, an output capacitor C1, a feedback circuit 108, and a control circuit 2. A first end of the inductor L1 is connected to the input line 102. The switching transistor M1 is arranged between a second end of the inductor L1 and a ground line 106. The output capacitor C1 is arranged between the output line 104 and the ground line 106. The rectifier diode D1 is connected such that its anode is connected to the second end of the inductor L1 and its cathode is connected to the output line 104. The feedback circuit 108 includes resistors R1 and R2, and is configured to divide the output voltage $V_{OUT}$, and to supplies the output voltage $V_{OUT}$ thus divided to a voltage feedback (VS) terminal of the control circuit 2.

The control circuit 2 controls the switching of the switching transistor M1 such that the feedback voltage $V_S$ at the VS terminal approaches a predetermined target voltage $V_{REF}$. With the present embodiment, the control circuit 2 is configured as a function IC (Integrated Circuit) in the form of a package. That is to say, the circuit elements and wiring that form the control circuit 2 are integrated on a single semiconductor chip 4.

The switching transistor M1 is built into the control circuit 2. It should be noted that, as the switching transistor M1, a bipolar transistor or otherwise an IGBT may be employed instead of a MOSFET (Metal Oxide Semiconductor Field Effect Transistor).

With the control circuit 2, the switching transistor M1 is configured such that its on resistance $R_{ON}$ is switchable between at least two values. With the present embodiment, the on resistance $R_{ON}$ is switchable between two values, i.e., between a first value $R_{ON1}$ and a second value $R_{ON2}$ that is sufficiently lower than the first value $R_{ON1}$.

The second value $R_{ON2}$ is determined so as to satisfy requirements such as the efficiency required for the DC/DC converter. Typically, the second on resistance $R_{ON2}$ is preferably set to as low a value as possible. Specifically, the second on resistance $R_{ON2}$ is set to a value ranging between several mΩ and several tens of mΩ. The setting of the first value $R_{ON1}$ will be described later.

The control circuit 2 includes a pulse modulator 10, a driver 12, and an on resistance controller 16, in addition to the switching transistor M1. The pulse modulator 10 generates a pulse signal $S_{PWM}$ having a duty ratio adjusted such that the output voltage $V_{OUT}$ of the DC/DC converter 100 approaches a predetermined target voltage. Typically, the pulse modulator 10 instructs an error amplifier (not shown) to amplify the difference between the feedback voltage $V_S$ and a predetermined reference voltage $V_{REF}$ so as to generate an error signal $V_{FB}$. Subsequently, the pulse modulator 10 converts the error signal $V_{FB}$ thus generated into a pulse signal $S_{PWM}$ having a duty ratio that corresponds to the voltage level of the error signal $V_{FB}$. The modulation method of the pulse modulator 10 is not restricted in particular. Examples of pulse modulators which can be employed as the pulse modulator 10 include voltage mode pulse modulators, current mode pulse modulators, hysteresis control modulators, and the like. The configuration of the pulse modulator 10 is not restricted in particular.

The driver 12 performs switching of the control terminal (gate) of the switching transistor M1 according to the pulse signal $S_{PWM}$.

When the switching transistor M1 is switched from off to on, in a first period T1 immediately after the switching, the on resistance controller 16 sets the on resistance $R_{ON}$ of the switching transistor M1 to the first value $R_{ON1}$. After the first period T1 elapses, in a second period T2 until the switching transistor M1 is turned off, the on resistance controller 16 sets the on resistance $R_{ON}$ of the switching transistor M1 to the second value $R_{ON2}$ that is lower than the first value $R_{ON1}$.

The on resistance controller 16 may switch the transistor size of the switching transistor M1 so as to change the on resistance $R_{ON}$, for example. Also, the on resistance controller 16 may switch the amplitude of the gate voltage (high level voltage) of the switching transistor M1 so as to change the on resistance $R_{ON}$.

It should be noted that the on resistance controller 16 is not necessarily required to be configured as a specified component built into the control circuit 2. Rather, the control circuit 2 may preferably be configured such that the switching between the first period T1 and the second period T2 is controlled in the overall control operation of the control circuit 2.

The above is the configuration of the control circuit 2 and the DC/DC converter 100 employing the control circuit 2.

Figure 3A:
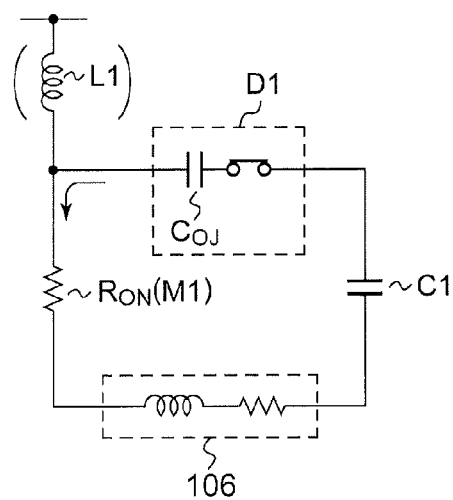
FIGS. 3A and 3B are each showing an equivalent circuit diagram showing the DC/DC converter in the on period of a switching transistor.
Figure 3B:
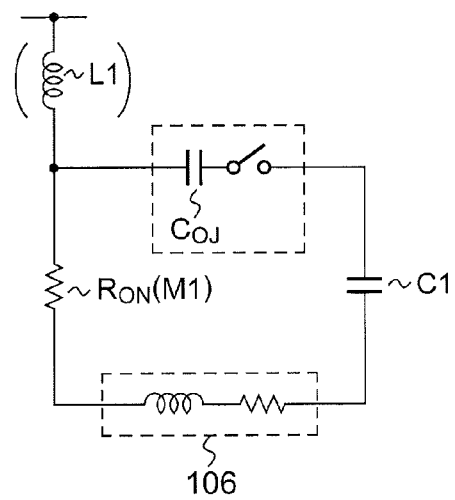

FIGS. 3A and 3B are equivalent circuit diagrams each showing the DC/DC converter 100 in the on period of the switching transistor M1. FIG. 3A shows an equivalent circuit for the reverse recovery time $T_{RR}$ of the rectifier diode D1 immediately after the switching transistor M1 is turned on. FIG. 3B shows an equivalent circuit after the reverse recovery time $T_{RR}$ elapses.

In the reverse recovery time $T_{RR}$, the rectifier diode D1 can be regarded as the capacitance $C_{OJ}$. In addition to the current that flows in the forward direction (direction from the anode to the cathode), in the reverse recovery time $T_{RR}$, discharge current flows through the rectifier diode D1 in the reverse direction (direction from the cathode to anode) from the capacitance $C_{OJ}$.

As shown in FIG. 3A, a loop comprising the output capacitor C1, the rectifier diode D1, the switching transistor M1, and the ground line 106 forms a series RLC resonance circuit. With the series resistance component of the loop as R, with the capacitance component of the loop as C, and with the series inductance component of the loop as L, the attenuation coefficient ξ is represented by the following Expression (1).

$$\xi = R/(2\sqrt{(L/C)}) \quad (1)$$

$R = R_{ON} + \Sigma Rp$
$C \approx C_{OJ}$
$L = \Sigma Lp$

Here, ΣRp represents the summation of the parasitic resistance components formed in the loop, and ΣLp represents the summation of the parasitic inductance components formed in the loop.

With such an RLC resonance circuit, in a case in which the relation ξ<1 holds true, this leads to damped oscillation of the system. Here, the damping time constant τ is represented by the following Expression (2).

$$\tau = 2L/R \quad (2)$$

Thus, as the value of R becomes greater, the oscillation damping becomes faster.

If the value of R is further raised such that the relation ξ>1 holds true, the system is exponentially damped without oscillation.

As shown in FIG. 3B, after the reverse recovery time $T_{RR}$ has elapsed, the RLC resonance circuit is shut off by means of the rectification function of the rectifier diode D1. Thus, in this stage, there is no oscillation in the switching voltage $V_{SW}$.

Figure 4:
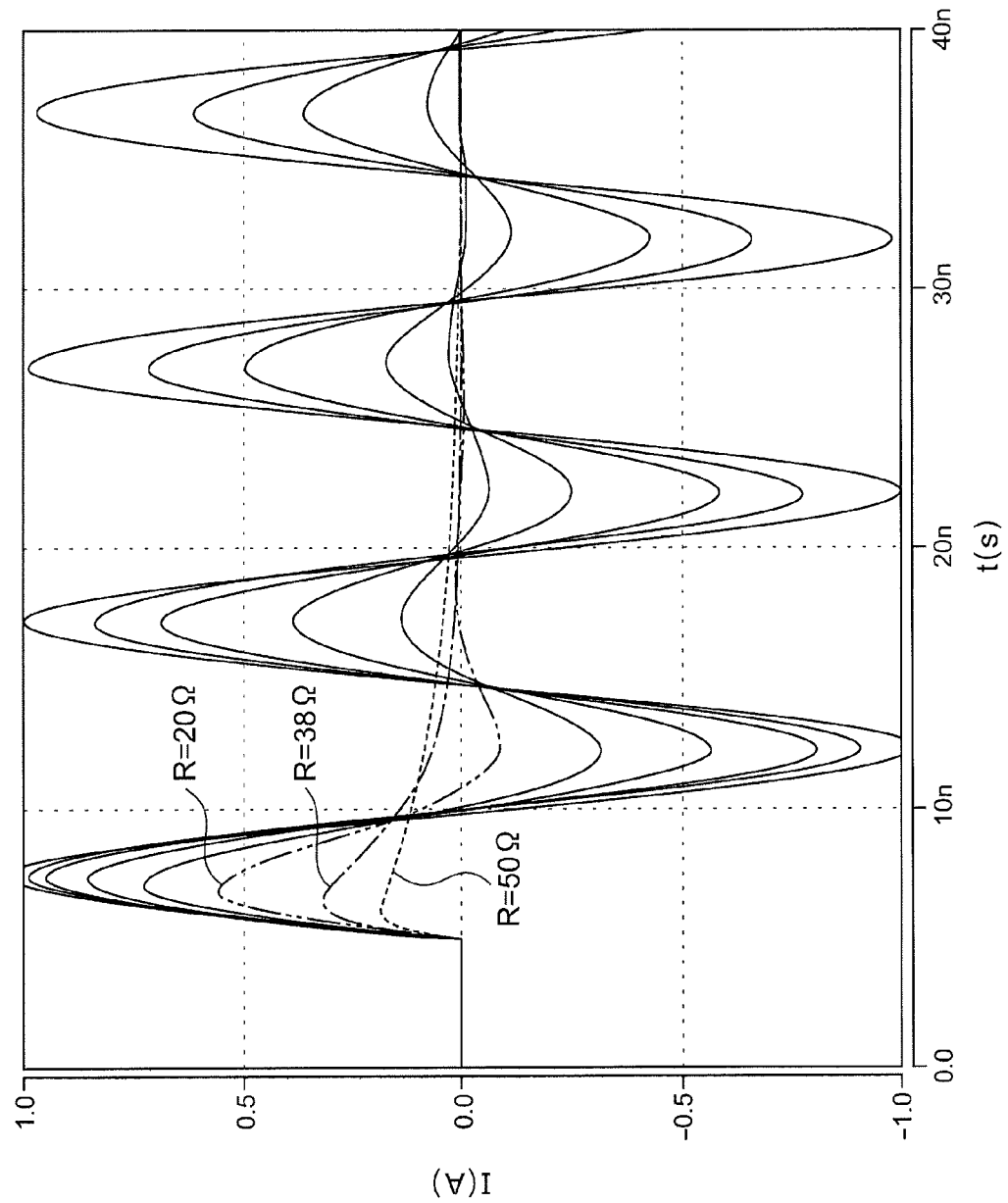
FIG. 4 is a simulation waveform diagram showing the state of an RLC resonance circuit shown in FIG. 3A.

FIG. 4 is a simulation waveform diagram showing a state of the RLC resonance circuit shown in FIG. 3A. FIG. 4 shows a current waveform with L=30 nH, and with C=85 PF when the resistance value R is changed.

With the control circuit 2 shown in FIG. 2, in the first period T1 that overlaps the reverse recovery time $T_{RR}$ when damped oscillation can occur in the RLC resonance circuit, by setting the on resistance $R_{ON}$ of the switching transistor M1 to $R_{ON1}$ such that the relation ξ>1 holds true, i.e., such that Expression (3) holds true, such an arrangement is capable of suppressing oscillation in the switching voltage $V_{SW}$ and the output voltage $V_{OUT}$.

$$R > (2\sqrt{(L/C)}) \quad (3)$$

For example, in a case in which the sum total of the parasitic inductance components L is 30 nH, and the capacitance $C_{OJ}$ of the rectifier diode D1 is 85 pF, $R_{ON1}$ may preferably be determined such that the relation R>(2√(30 nH/85 pF))≈38Ω holds true. For example, in a case in which the sum total of parasitic resistance components ΣRp is 8Ω, $R_{ON1}$ is preferably set to be higher than 30Ω, thereby suppressing oscillation in the switching voltage $V_{SW}$ and the output voltage $V_{OUT}$.

There are multiple kinds of printed circuit boards, and in some cases the parasitic inductance cannot be estimated. Even in this case, if the resonance frequency to be avoided is known, with the resonance frequency to be avoided as fc, the resistance value which allows resonance to be avoided only at the resonance frequency fc can be calculated based on the following Expressions, so as to avoid resonance at that frequency.

$$fc = 1/(2\pi\sqrt{(L \times C)})$$

$$\sqrt{L} = 1/(2\pi fc\sqrt{C})$$

$$R = 2\sqrt{R}\sqrt{C} = 2/(2\pi \times fc \times \sqrt{C} \times \sqrt{C}) = 1/(\pi \times fc \times C) > 1$$

Thus, R which satisfies the relation ξ>1 is represented by the following Expression.

$$R = 1/(\pi \times fc \times C).$$

For example, in a case in which fc=80 MHz, R is determined to be 46Ω based on the relation expression R=1/(π×80 MHz×85 pF).

In a case in which the first period T1 is shorter than the reserve recovery time $T_{RR}$, the reverse recovery time $T_{RR}$ continues after the first period T1 ends. If the on resistance of the switching transistor M1 is switched to the second value $R_{ON2}$ having a relatively low value after the first period T1 ends, in some cases, the condition for resonance, i.e., the relation ξ<1, is satisfied. In this case, if the resonance energy that occurs in the resonance circuit is not sufficiently damped in the first period T1, in some cases, there is a risk of oscillation in the switching voltage $V_{SW}$ or the output voltage $V_{OUT}$.

In order to solve such a problem, by setting the relation T1≥$T_{RR}$, such an arrangement ensures that there is no oscillation in the reverse recovery time $T_{RR}$. Otherwise, even if resonance occurs, such an arrangement ensures that the resonance settles in a short period of time.

It should be noted that, if the on resistance of the switching transistor M1 is maintained at the first value $R_{ON1}$ after the reverse recovery time $T_{RR}$ elapses, this leads to a problem of increased switching loss although there is no risk of resonance. Thus, the first period T1 is preferably set to be as short as possible while satisfying the relation T1≥$T_{RR}$.

Figure 1:
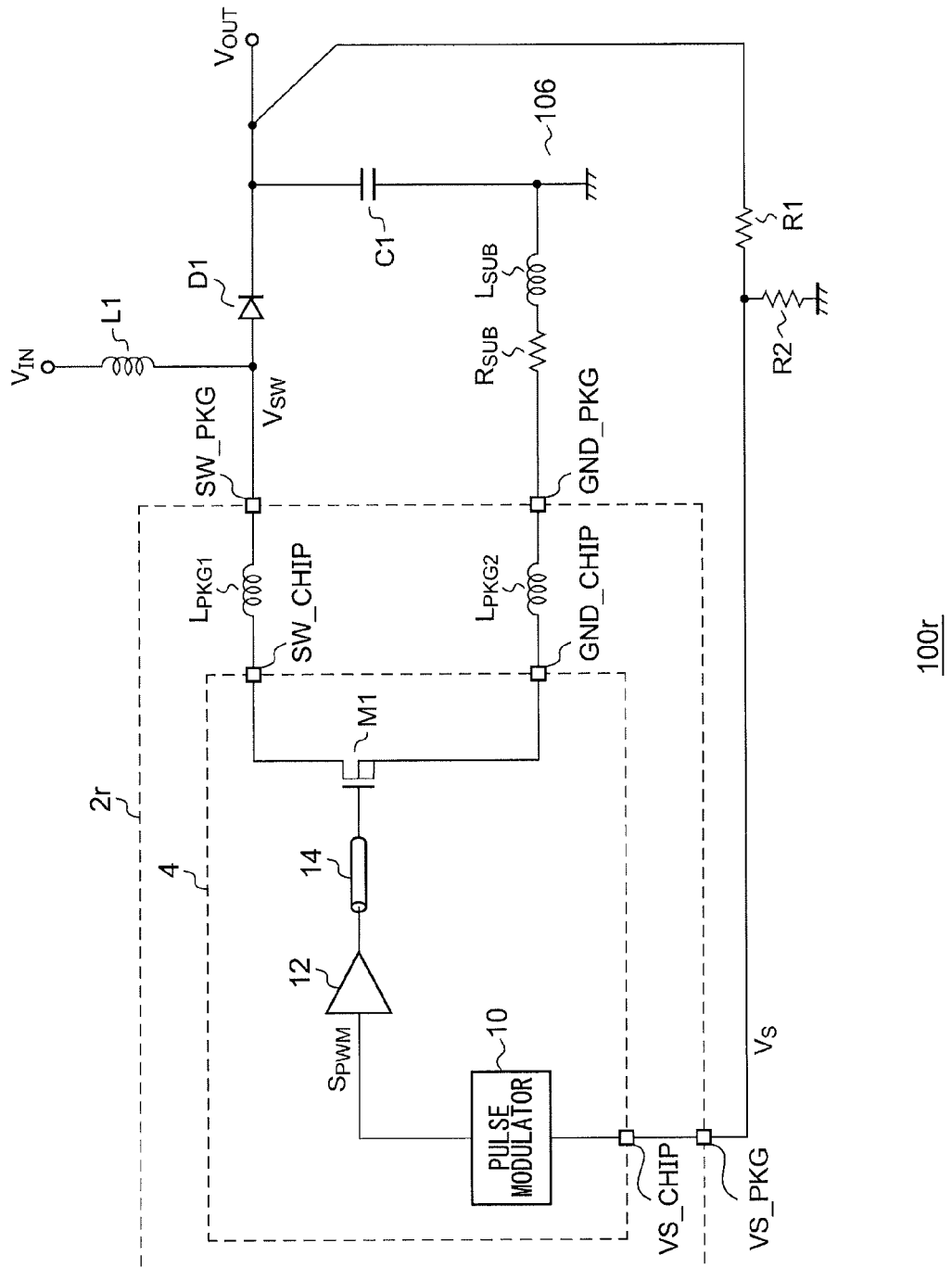
FIG. 1 is a circuit diagram showing a conventional configuration of a step-up DC/DC converter.

FIG. 5A is a waveform diagram showing the operation of the control circuit 2. FIG. 5B is a waveform diagram showing the operation of the control circuit 2r shown in FIG. 1.

In order to clarify the advantage of the control circuit 2 shown in FIG. 2, first, description will be made with reference to FIG. 5B regarding the operation of the control circuit 2r according to a conventional technique. In the drawing, the second and subsequent waveforms are shown with an expanded time scale.

During the period from the time point t0 to the time point t1, the switching transistor M1 is turned off. In this period, the switching voltage $V_{SW}$ is set to $(V_{out}+V_F)$. Here, $V_F$ represents the forward voltage of the rectifier diode D1.

At the time point t1, the pulse signal $S_{PWM}$ is switched to high level, which turns on the switching transistor M1. With the control circuit 2r shown in FIG. 1, at the time point t1, the on resistance $R_{ON}$ of the switching transistor M1 is reduced to a value that corresponds to the second value $R_{ON2}$.

The on resistance $R_{ON2}$ is very low. This reduces the value of the resistance R in Expression (1), leading to a situation in which ξ<<1. As a result, damped oscillation occurs in the RLC resonance circuit. The damping time constant τ is represented by Expression (2). Thus, as the resistance value R becomes lower, the time constant τ becomes greater. As a result, with the control circuit 2r shown in FIG. 1, great oscillation occurs in the output voltage $V_{OUT}$ and the switching voltage $V_{SW}$, leading to the occurrence of electromagnetic noise.

Next, description will be made with reference to FIG. 5A regarding the operation of the control circuit 2 shown in FIG. 2. Description will be made below assuming that the relation T1>$T_{RR}$ holds true, and the relation ξ>1 holds true.

At the time point t1, the pulse signal $S_{PWM}$ is switched to high level, which turns on the switching transistor M1.

In the first period T1 after the pulse signal $S_{PWM}$ is switched to high level, the on resistance controller 16 sets the on resistance of the switching transistor M1 to the first value $R_{ON1}$. In this state, the relation ξ>1 holds true, and resonance is suppressed.

After the first period T1 ends, the period becomes the second period T2. In this period, the on resistance controller 16 sets the on resistance of the switching transistor M1 to the second value $R_{ON2}$. This allows the switching loss of the switching transistor M1 to be reduced.

A control circuit, a DC/DC converter, and a control method for a DC/DC converter based on the concept described above are encompassed within the technical scope of the present invention.

Description will be made below regarding a specific configuration of the control circuit 2 with reference to embodiments.

First Embodiment

Figure 6:
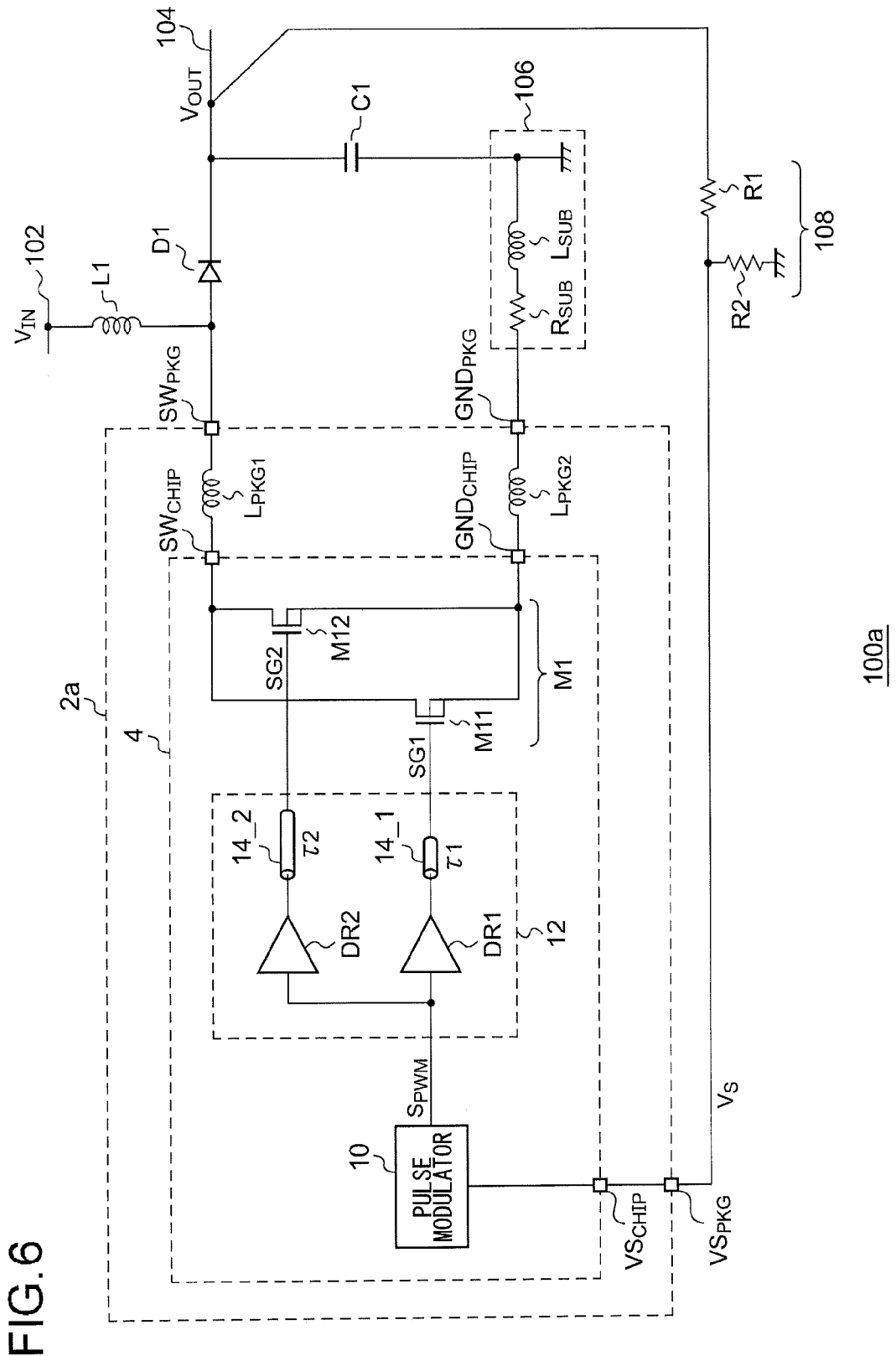
FIG. 6 is a circuit diagram showing a configuration of a control circuit according to a first embodiment.

FIG. 6 is a circuit diagram showing a configuration of a control circuit 2a according to a first embodiment.

With the first embodiment, the switching transistor M1 includes at least two transistor elements, e.g., transistor elements M11 and M12, (description will be made in the present embodiment regarding a switching transistor M1 comprising two transistor elements) configured such that their drains are connected in common, their sources are connected in common, and their control terminals (gates) are each configured independently, i.e., such that the transistor elements are connected in parallel.

The control circuit 2 instructs the on resistance controller 16 shown in FIG. 2 to switch the on-state transistor element between the transistor elements M11 and M12 according to the first period T1 and the second period T2. Thus, such an arrangement is capable of switching the on resistance $R_{ON}$ of the switching transistor M1 between two values that correspond to the combined resistance of the multiple transistor elements.

The first transistor element M11 is turned on at least for the first period T1. For the second period T2, the first transistor M11 may be turned on. Otherwise, the first transistor M11 may be turned off. Description will be made below in the present embodiment regarding an arrangement in which the switching transistor element M11 is turned on for both the first period T1 and the second period T2.

The second transistor element M12 is turned on only for the second period T2.

The driver 12 includes a first driver DR1 and a second driver DR2. The first driver DR1 sets the gate pulse signal SG1 to high level so as to turn on the first transistor element M11 for the first period T1 and the second period T2, i.e., the whole on period $T_{ON}$ when the switching transistor M1 is to be turned on. During the second period T2, the second driver DR2 sets to the gate pulse signal SG2 to high level so as to turn on the second transistor element M12.

The propagation delay T1 that occurs due to the path between the first driver DR1 and the gate of the first transistor element M11 and the propagation delay t2 that occurs due to the path between the second driver DR2 and the gate of the second transistor element M12 may be configured such that there is a difference of Δτ between them. In this case, after the propagation delay τ1 elapses after the pulse signal $S_{PWM}$ transits to high level, the first transistor M11 is turned on, and after the propagation delay τ2 elapses after the pulse signal $S_{PWM}$ transits to high level, the second transistor element M12 is turned on. Thus, the time difference Δτ=(τ2−τ1) corresponds to the first period T1.

In the control circuit 2a shown in FIG. 6, it can be said that a component comprising the switching transistor M1 having the first transistor element M11 and the second transistor element M12 each configured as a separate transistor element, the driver 12 having the first driver DR1 and the second driver DR2 each configured as a separate driver, and propagation paths 14_1 and 14_2 which respectively provide the propagation delays τ1 and τ2 corresponds to the on resistance controller 16 shown in FIG. 2.

It should be noted that the propagation paths 14_1 and 14_2 having a delay difference may be arranged as upstream components of the first driver DR1 and the second driver DR2. With such an arrangement, there is a difference between the delay T1 that occurs in the pulse signal $S_{PWM}$ supplied to the first driver DR1 and the delay T2 that occurs in the pulse signal $S_{PWM}$ supplied to the second driver DR2.

The above is the configuration of the control circuit 2a.

Figure 7:
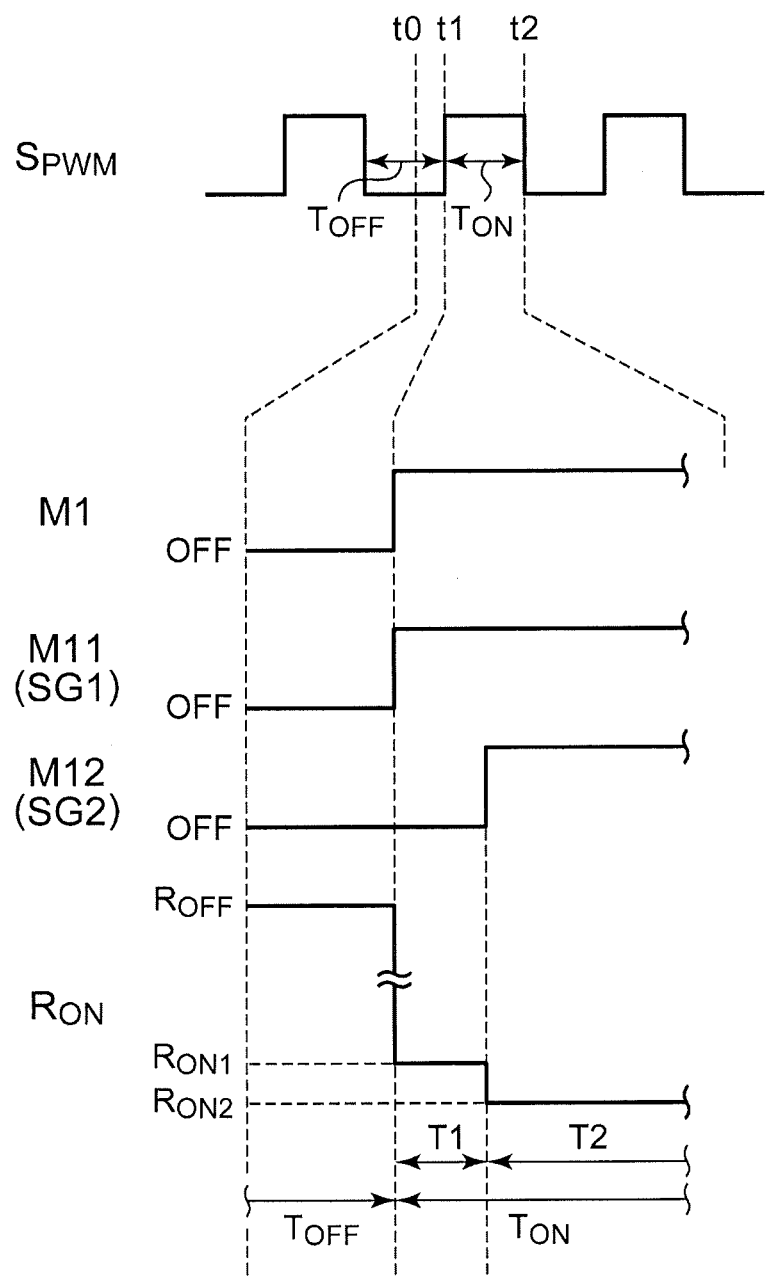
FIG. 7 is a waveform diagram showing the operation of the control circuit shown in FIG. 6.

FIG. 7 is an operation waveform diagram of the control circuit 2a shown in FIG. 6. At the time point t1, the pulse signal $S_{PWM}$ is switched from the off time $T_{OFF}$ to the on time $T_{ON}$. When the first driver DR1 receives the signal transition, the first driver DR1 turns on the first transistor element M11. In this stage, the whole on resistance $R_{ON1}$ of the switching transistor M1 becomes $R_{ON11}$. It should be noted that $R_{ON11}$ represents the on resistance of the first transistor element M11.

Subsequently, the period progresses to the second period T2 after the first period T1 from the time point t1, and the second transistor M12 is turned on by the second driver DR2. For the second period T2, the whole on resistance $R_{ON2}$ of the switching transistor M1 is represented by ($R_{ON11}//R_{ON12}$). Here, $R_{ON12}$ represents the on resistance of the second transistor M12, and the symbol "//" is an operator which represents the combined resistance of two resistance components connected in parallel.

With the configuration shown in FIG. 7, such an arrangement allows the on resistance $R_{ON}$ of the switching transistor M1 to be switched between multiple values.

Figure 8:
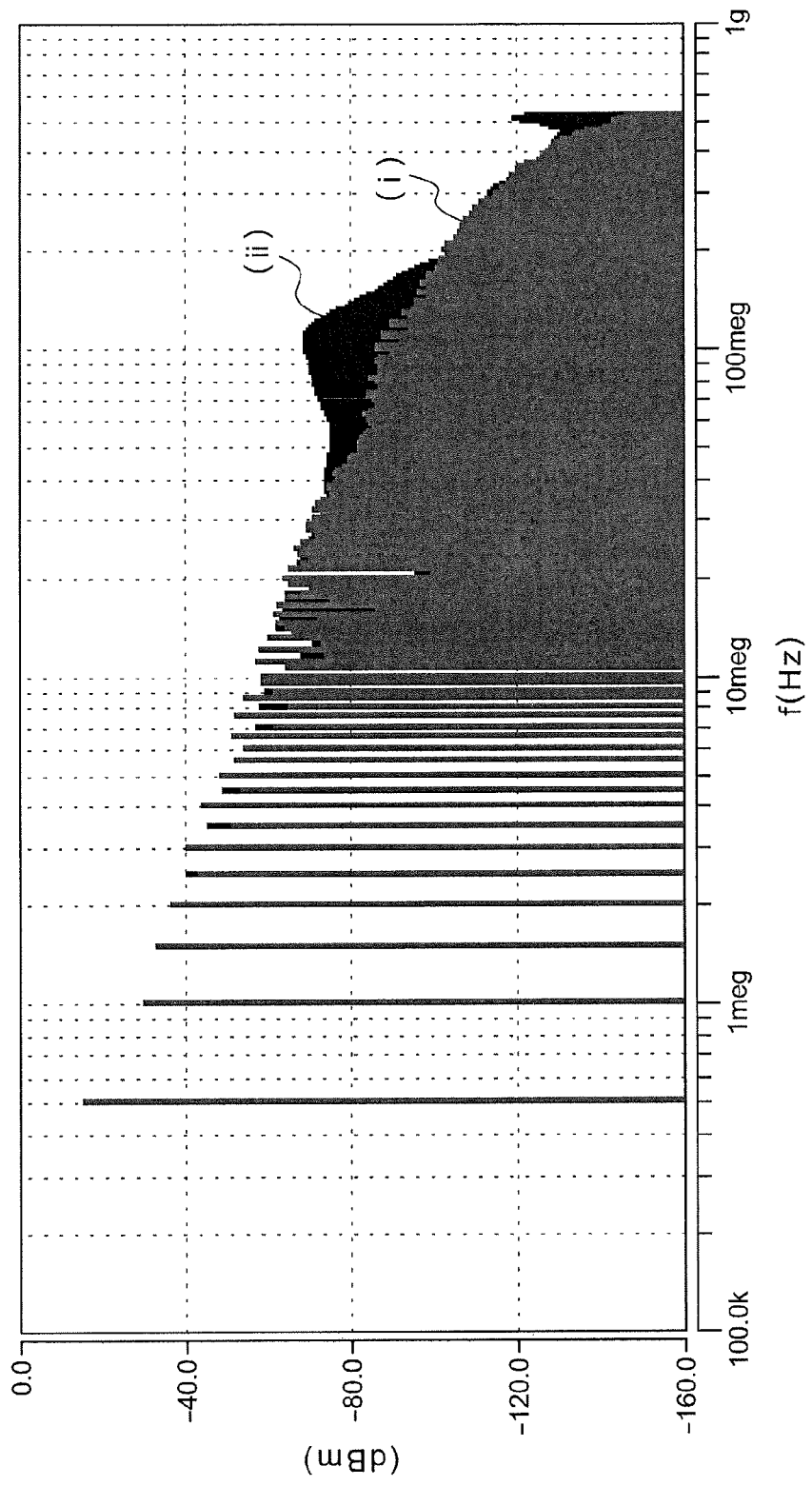
FIG. 8 is a diagram showing a spectrum of current that flows through the DC/DC converter shown in FIG. 6.

FIG. 8 is a diagram showing a spectrum (i) of the current that flows through the DC/DC converter 100a shown in FIG. 6. Also, FIG. 8 shows a spectrum (ii) of the current that flows through the DC/DC converter 100r shown in FIG. 1. As can be clearly understood from FIG. 8, with the DC/DC converter 100a shown in FIG. 6, such an arrangement is capable of providing a great reduction in the current magnitude, in the vicinity of 100 MHz.

Second Embodiment

As described above, in order to suppress resonance for the reverse recovery time $T_{RR}$, it is desirable for the relation $\xi > 1$ to be satisfied in the first period T1 which is determined such that the relation $T1 \geq T_{RR}$ holds true.

It can be assumed that there is a difference in the reverse recovery time $T_{RR}$ of the rectifier diode D1 between the value of the step-up DC/DC converter 100 that is manufactured by assembling the components such as the control circuit 2, the rectifier diode D1, etc., and the design value estimated in the original design stage, due to modification of the specifications of the rectifier diode D1. Thus, if the length of the first period T1 is fixed in the control circuit 2, if there is a difference between the actual value $T_{RR\_REAL}$ and the originally deigned value $T_{RR\_TYP}$ of the reverse recovery time $T_{RR}$, there is a risk that (i) the relation $T1 \ll T_{RR}$ will hold true, resonance will occur, and EMI noise will be emitted, or that (ii) the relation $T1 \gg T_{RR}$ will hold true, leading to a problem of unnecessarily increased switching loss.

Figure 9A:
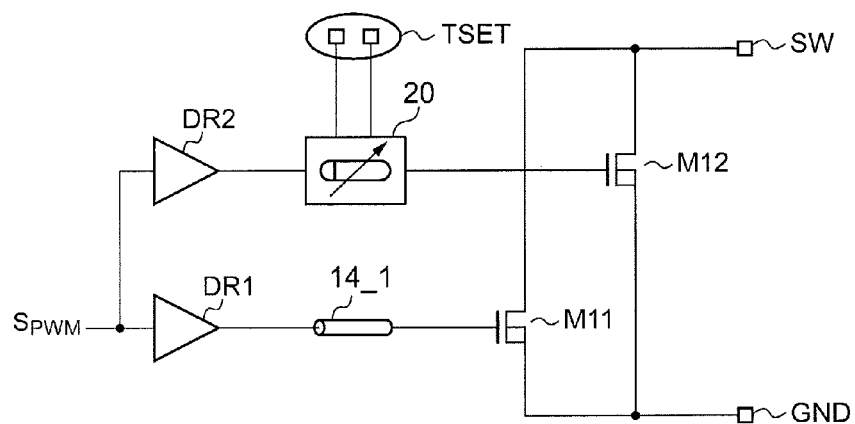
FIGS. 9A and 9B are circuit diagrams each showing a configuration of a control circuit according to a second embodiment.
Figure 9B:
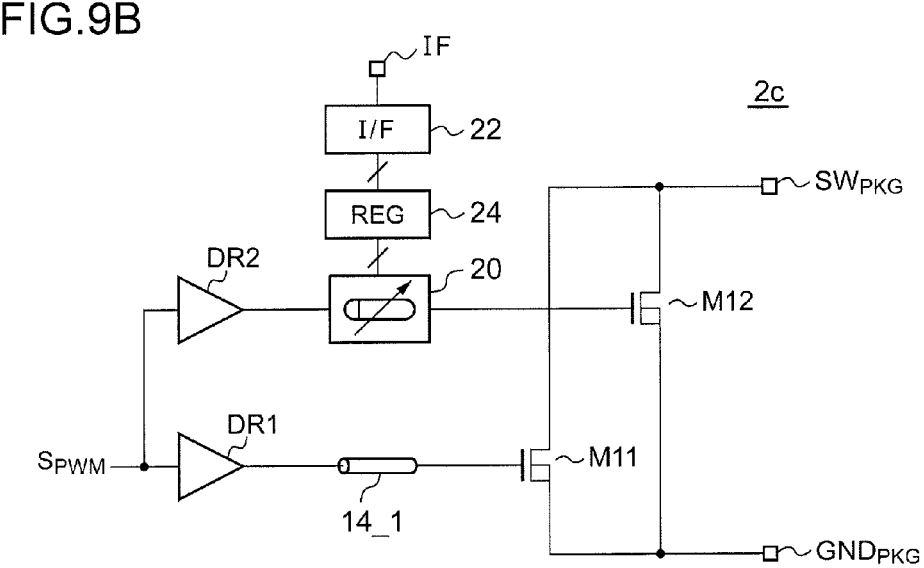

FIGS. 9A and 9B are circuit diagrams respectively showing the configurations of the control circuits 2b and 2c according to the second embodiment. In the following embodiments, the package terminal $XX_{PKG}$ and the chip terminal $XX_{CHIP}$ will not be differentiated, and will collectively represented by "XX".

The control circuits 2b and 2c shown in FIGS. 9A and 9B are each configured to be capable of changing the length of the first period T1. For example, a variable delay circuit 20 is provided on a path of the gate pulse signal SG2, instead of or otherwise in addition to the propagation path 14_2. By changing the delay amount of the variable delay circuit 20, the control circuit 2b is capable of adjusting the length of the first period T1.

At least one external setting terminal TSET is provided to the control circuit 2b, so as to allow the reverse recovery time $T_{RR}$ of the actual rectifier diode D to be set from the outside.

For example, two external setting terminals TSET are provided to the control circuit 2b, which allows their states (pull-up state, pull-down state, etc.) to be set from the outside. That is to say, by making a combination of the states of the two external setting terminals TSET, such an arrangement allows the settings for the reverse recovery time $T_{RR}$ to be switched between four values.

The variable delay circuit 20 is configured such that its delay amount is adjustable according to the state of the external setting terminals TSET. The variable delay circuit 20 may be configured as a digital counter or otherwise as an analog or digital delay circuit.

The control circuit 2c shown in FIG. 9B is configured to be capable of changing the length of the first period T1. The control circuit 2c includes: an interface (IF) terminal connected to an external host processor (not shown) via a bus (not shown); an interface circuit 22; and a register 24. The interface circuit 22 receives, from the host processor, data which represents the reverse recovery time $T_{RR}$ of the actual rectifier diode D1, and stores the data thus received in the register 24. The delay amount is set for the variable delay circuit 20 according to the data stored in the register 24.

With the control circuits 2b and 2c shown in FIGS. 9A and 9B, such an arrangement allows the first period T1 to have a suitable length based on the reverse recovery time $T_{RR}$ of the rectifier diode D1 that is actually employed.

Third Embodiment

It can be assumed that there are cases in which there is a difference in the value of the capacitance $C_{OJ}$ of the rectifier diode D1 and the design value estimated in the original design stage for the control circuit, due to modification of the specifications of the rectifier diode D1. If the capacitance $C_{OJ}$ becomes smaller than the originally designed value, the attenuation coefficient $\xi$ becomes smaller, and this has the property of potential oscillation in the voltage.

Figure 10A:
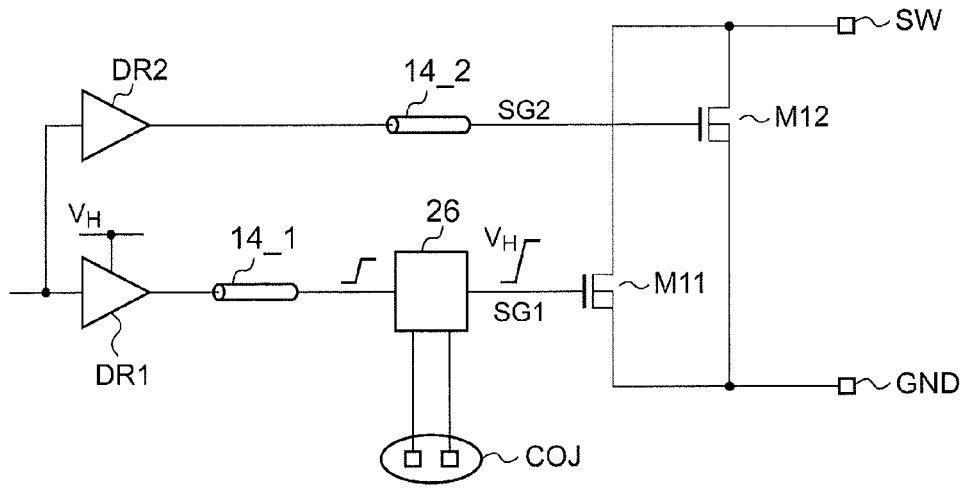
FIGS. 10A and 10B are circuit diagrams each showing a configuration of a control circuit according to a third embodiment.
Figure 10B:
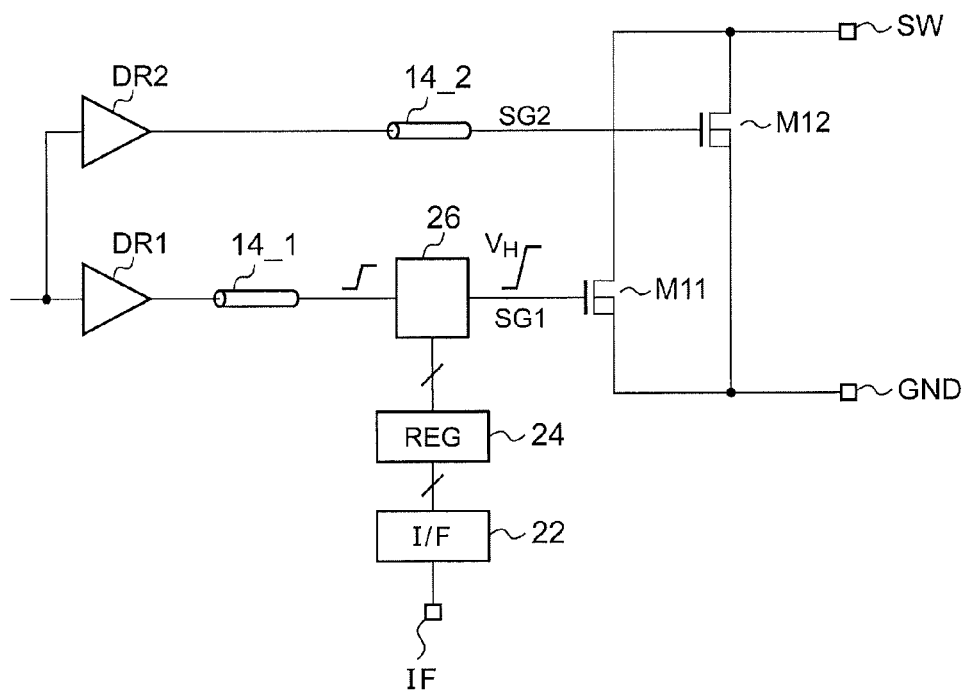

FIGS. 10A and 10B are circuit diagrams respectively showing the configurations of control circuits 2d and 2e according to the third embodiment. The control circuits 2d and 2e according to the third embodiment are each configured to be capable of changing the on resistance of the switching transistor M1 to be set for the first period T1, i.e., the on resistance $R_{ON1}$ of the first transistor element M11. The on resistance of a MOSFET changes according to the gate-source voltage $V_{GS}$. Accordingly, the control circuits 2d and 2e each include a driving adjustment circuit 26 which adjusts the amplitude of the gate pulse signal SG1 to be supplied to the control terminal (gate) of the first transistor element M11. It should be noted that the control circuit may be configured to adjust the size of the first transistor M11 instead of adjusting the amplitude of the gate pulse signal SG1.

For example, the driving adjustment circuit 26 may adjust the gate resistance of the first transistor element M11. Alternatively, the driving adjustment circuit 26 may adjust the voltage VH supplied to the higher-side power supply terminal of the first driver DR1.

The amplitude of the gate pulse signal SG1 can be adjusted according to the capacitance $C_{OJ}$ of the actual rectifier diode D1.

The control circuit 2d shown in FIG. 10A includes at least one external setting terminal $C_{OJ}$ for setting the capacitance $C_{OJ}$. The driving adjustment circuit 26 adjusts the amplitude of the gate pulse signal SG1 according to the external setting terminal $C_{OJ}$.

With the control circuit 2e shown in FIG. 10B, the interface circuit 22 receives, from the external host processor, data which indicates the capacitance $C_{OJ}$, and stores the data thus received in the register 24. The driving adjustment circuit 26 adjusts the amplitude of the gate pulse signal SG1 according to the data stored in the register 24.

With the control circuits 2d and 2e shown in FIGS. 10A and 10B, such an arrangement is capable of adjusting the first value $R_{ON1}$ of the on resistance of the switching transistor M1 to a suitable value based on the capacitance $C_{OJ}$ of the rectifier diode D1 that is actually employed.

Fourth Embodiment

Description has been made in the second and third embodiments regarding an arrangement in which the settings for the reverse recovery time $T_{RR}$ of the rectifier diode D1 are made from the outside and an arrangement in which the settings for the capacitance value $C_{OJ}$ of the rectifier diode D1 are made from the outside. Description will be made in the fourth embodiment regarding an arrangement in which the control circuit 2d itself executes a calibration sequence so as to measure at least one of the reverse recovery time $T_{RR}$ or the capacitance $C_{OJ}$ of the rectifier diode D1 that is employed Description will be made below regarding an arrangement configured to measure them both.

Figure 11:
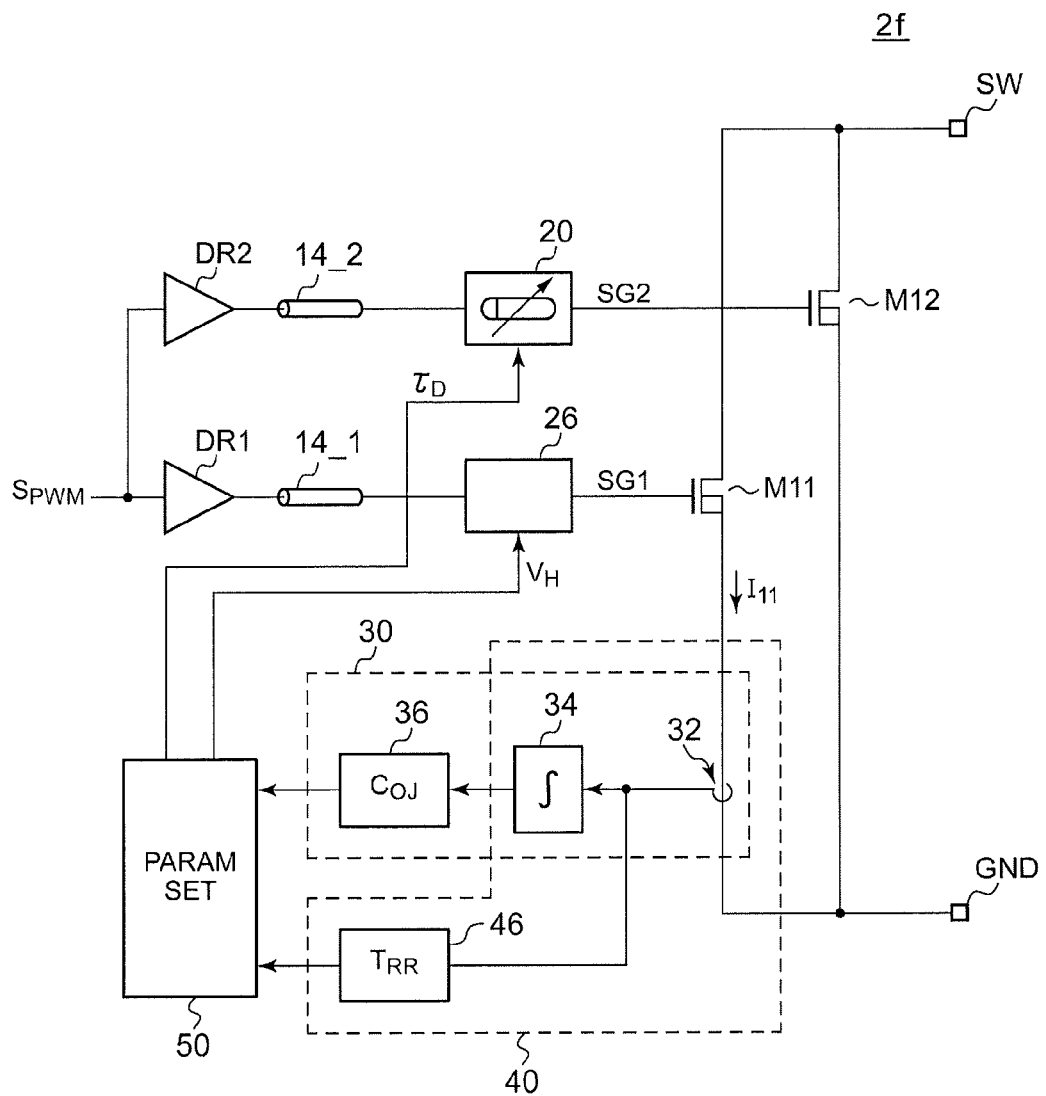
FIG. 11 is a circuit diagram showing a configuration of a control circuit according to a fourth embodiment.
Figure 12:
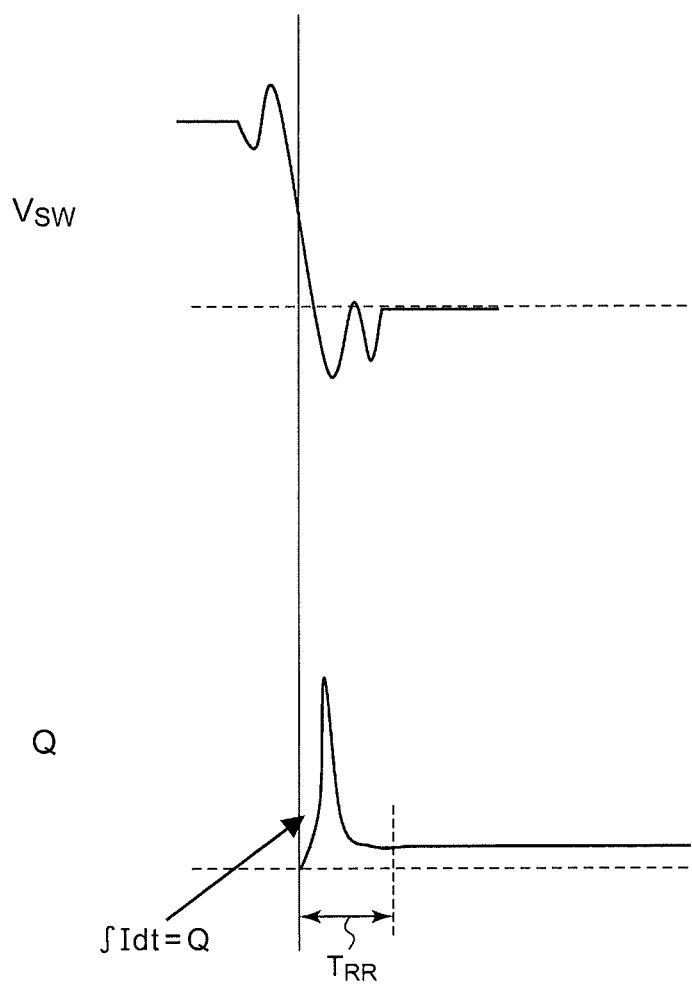
FIG. 12 is a waveform diagram showing the operation of the control circuit shown in FIG. 11.

FIG. 11 is a circuit diagram showing a configuration of a control circuit 2f according to the fourth embodiment. FIG. 12 is a waveform diagram showing the operation of the control circuit 2f shown in FIG. 11. The control circuit 2f includes a capacitance measurement circuit 30, a time measurement circuit 40, and a parameter setting unit 50.

In the calibration sequence, the capacitance measurement circuit 30 detects the capacitance $C_{OJ}$ of the rectifier diode by integrating the current that flows when the switching transistor M1 has been turned on after the rectifier diode D1 has been charged using a predetermined voltage.

Specifically, the capacitance measurement circuit includes a current sensor 32, an integrator 34, and a capacitance calculation unit 36.

When the switching transistor M1 is turned off, the capacitance $C_{OJ}$ of the rectifier diode is charged according to the voltage difference $\Delta V$ between the current input voltage $V_{IN}$ and the current output voltage $V_{OUT}$. The voltage difference $\Delta V$ is known. In this case, the charge amount Q stored in the capacitance $C_{OJ}$ is represented by the following Expression.

$$Q = C_{OJ} \cdot \Delta V$$

Subsequently, when the switching transistor M1 is turned on, the discharge current flows through the switching transistor M1. With the present embodiment, only the first transistor element M11 is turned on, and the second transistor element M12 is turned off. The current sensor 32 detects the discharge current $I_{11}$ that flows through the first transistor element M11. The configuration of the current sensor 32 is not restricted in particular. For example, (i) an arrangement may be made including a current mirror circuit which copies the current that flows through the first transistor element M11. Also, (ii) an arrangement may be made including a detection resistor arranged on a path of the discharge current $I_{11}$, and configured to detect the voltage drop across the detection resistor as the current value. Alternatively, (iii) an arrangement may be made in which the known on resistance of the first transistor element M11 itself is used instead of the detection resistor. That is to say, the configuration of the detection resistor is not restricted in particular.

The integrator 34 integrates the discharge current $I_{11}$ so as to calculate the charge amount Q. The integrator 34 may be configured as a low-pass filter. The integrator 34 may have (i) a configuration so as to charge a capacitance using the current detected by the current sensor 32. Also, the integrator 34 may have (ii) a configuration in which the current value detected by the current sensor 32 is converted into a digital value, and the digital value thus converted is integrated. That is to say, the configuration of the integrator 34 is not restricted in particular.

The capacitance calculation unit 36 is capable of calculating the capacitance $C_{OJ}$ of the rectifier diode based on the relation $C_{OJ} = Q/\Delta V$.

Furthermore, in the calibration sequence, the time measurement circuit 40 detects the reverse recovery time of the rectifier diode D1 based on the waveform of the current that flows when the switching transistor M1 is turned on after the rectifier diode D1 is charged using a predetermined voltage difference $\Delta V$.

Specifically, the time measurement circuit 40 includes a current sensor 32, an integrator 34, and a time acquisition unit 46.

As described above, when the switching transistor M1 is turned off, the capacitance $C_{OJ}$ of the rectifier diode is charged according to the voltage difference $\Delta V$ between the current input voltage $V_{IN}$ and the current output voltage $V_{OUT}$. Subsequently, when the switching transistor M1 is turned on, discharge current flows through the switching transistor M1 during the reverse recovery time $T_{RR}$ of the rectifier diode D1. With the present embodiment, only the first transistor element M11 is turned on, and the second transistor element M12 is turned off. The current sensor 32 detects the discharge current $I_{11}$ that flows through the first transistor element M11. The integrator 34 integrates the discharge current $I_{11}$.

As shown in FIG. 12, after the progress of the reverse recovery time $T_{RR}$, the integrated waveform of the discharge current $I_{11}$ has a substantially constant level. Accordingly, the time acquisition unit 46 measures the time up to the time point at which the integrated waveform of the discharge current $I_n$ is stabilized at a constant level, so as to acquire the reverse recovery time $T_{RR}$. It should be noted that the capacitance calculation unit 36 may acquire the reverse recovery time $T_{RR}$ based on the output of the current sensor 32, instead of the output of the integrator 34.

The measurement of the capacitance $C_{OJ}$ by means of the capacitance measurement circuit 30 and the measurement of the reverse recovery time $T_{RR}$ by means of the time measurement circuit 40 may be performed at the same time, or otherwise may be performed separately.

The parameter setting unit 50 adjusts the driving adjustment circuit 26 based on the capacitance $C_{OJ}$ acquired by the capacitance measurement circuit 30. Furthermore, the parameter setting unit 50 adjusts the driving adjustment circuit 26 based on the reverse recovery time $T_{RR}$ acquired by the time measurement circuit 40.

With the control circuit 2f, such an arrangement is capable of suppressing oscillation in a sure manner even if a substitute rectifier diode D1 is employed due to modification of the design, or otherwise even if the parasitic resistance, the parasitic inductance, or the like, changes due to modification of the design of the printed circuit board or the like.

As a modification of the fourth embodiment, only one of the reverse recovery time $T_{RR}$ or the capacitance $C_{OJ}$ of the rectifier diode D1 employed in actuality may be measured.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Description has been made in the embodiments regarding an arrangement in which the circuit constants are determined so as to satisfy the relation ξ>1. However, the present invention is not restricted to such an arrangement. Also, the resistance component R, i.e., the value $R_{ON1}$ of the on resistance $R_{ON}$ of the switching transistor M1, may be determined such that the time constant τ is sufficiently short. Such an arrangement is capable of reducing the spectrum component of the switching voltage $V_{SW}$ in the vicinity of the resonance frequency even if the relation ξ>1 holds true in the first period T1.

Second Modification

In a case in which the first period T1 is shorter than the reverse recovery time $T_{RR}$, resonance can occur even after the first period T1 has ended. However, in a case in which the energy stored in the resonance circuit is sufficiently damped in the first period T1, even if oscillation occurs in the switching voltage $V_{SW}$ or the output voltage $V_{OUT}$ after the first period T1 elapses, the emission of electromagnetic energy is small. In some cases, the electromagnetic energy thus emitted satisfies the EMI standards. In this case, an arrangement may be made in which T1<$T_{RR}$.

Third Modification

With the present embodiment, the switching transistor M1 is configured as a MOSFET. Also, the switching transistor M1 may be configured as a bipolar transistor or an IGBT (Insulated Gate Bipolar Transistor).

Fourth Modification

The settings of the signals, such as the high-level state and the low-level state of the signals, and the magnitude relations of the voltage signals, have been described in the present embodiments for exemplary purposes only. The settings can be freely modified by inverting the signals using inverters or the like.

Figure 13A:
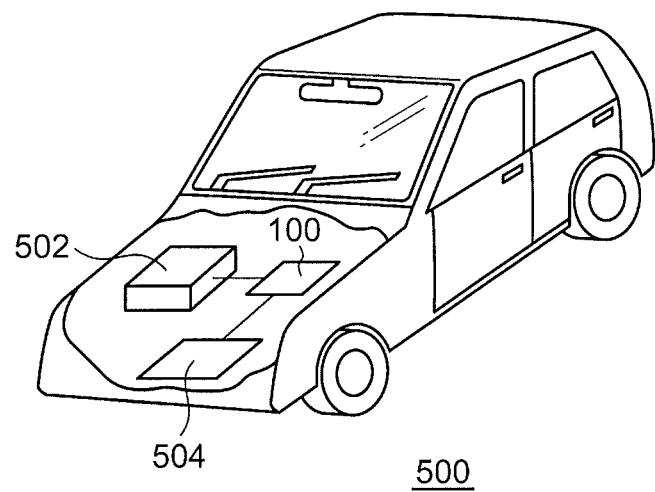
FIG. 13A is a diagram showing a vehicle including a DC/DC converter.

Lastly, description will be made regarding the usage of the DC/DC converter 100. FIG. 13A is a diagram showing a vehicle including the DC/DC converter 100. A vehicle 500 includes an in-vehicle battery 502, the DC/DC converter 100, and a load 504. The in-vehicle battery 502 generates a DC voltage $V_{BAT}$ of 12 V or otherwise 24 V. The DC/DC converter 100 steps up and stabilizes the battery voltage $V_{BAT}$ to a predetermined level, and supplies the voltage thus stepped up and stabilized to the load 504.

The vehicle system employs an FM-VICS (Vehicle Information and Communication System, trademark) which uses the FM band. Thus, if FB band noise is emitted from the DC/DC converter 100, this leads to instability of the vehicle system. By employing the DC/DC converter 100 according to the embodiment, such an arrangement is capable of reducing the FM band electromagnetic noise, thereby providing a stabilized system.

Figure 13B:
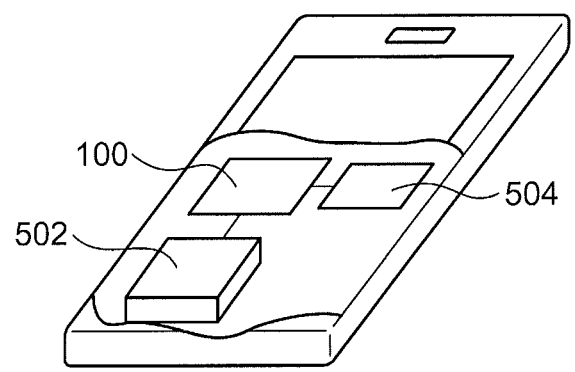
FIG. 13B is a diagram showing an electronic device including a DC/DC converter.

FIG. 13B is a diagram showing an electronic device 600 including the DC/DC converter 100. Examples of such an electronic device 600 include cellular phone terminals, tablet PCs, digital still cameras, digital video cameras, etc. The electronic device 600 includes a battery 602, the DC/DC converter 100, and a load 604. The DC/DC converter 100 steps up the battery voltage $V_{BAT}$, and supplies the voltage thus stepped up to the load 604. Examples of such a load 604 include liquid crystal drivers, liquid crystal backlight LEDs, and camera flash LEDs, etc.

By employing the DC/DC converter 100 according to the embodiment, such an arrangement is capable of reducing FM band electromagnetic noise, thereby reducing the effect on other electronic devices in the vicinity of the electronic device.

The electronic device may be configured as a consumer electronics device such as a TV, a PC, a refrigerator, etc.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a step-up DC/DC converter, wherein the step-up DC/DC converter comprises an inductor, a rectifier diode, an output capacitor, and a switching transistor,
   and wherein the switching transistor is configured such that its on resistance is switchable between at least two values,
   and wherein the control circuit is configured such that, when the switching transistor is switched from off to on, the control circuit sets the on resistance of the switching transistor to a first value for a first period immediately after the switching of the switching transistor, following which the control circuit sets the on resistance of the switching transistor to a second value that is smaller than the first value for a second period until the switching transistor is turned off, wherein, with a series resistance component of a loop comprising the output capacitor, the rectifier diode, the switching transistor, and a ground line as R, with a capacitance component of this loop as C, and with a series inductance component of this loop as L, the first value is determined such that the relation $R/(2\sqrt{(L/C)})>1$ is satisfied.

2. The control circuit according to claim 1, wherein the first period is configured to have a length which is equal to or otherwise greater than a reverse recovery time of the rectifier diode.

3. The control circuit according to claim 1, wherein the control circuit is configured to be capable of adjusting the length of the first period according to a reverse recovery time of the rectifier diode.

4. The control circuit according to claim 1, wherein the switching transistor comprises a plurality of transistor elements connected in parallel such that their control terminals are provided independently,
   and wherein the on-state transistor element is switched according to switching between the first period and the second period, thereby switching the on resistance of the switching transistor corresponding to a combined resistance of the plurality of switching elements.

5. The control circuit according to claim 4, comprising:
   a pulse modulator configured to generate a pulse signal having a duty ratio adjusted such that a feedback voltage that corresponds to an output voltage of the step-up DC/DC converter approaches a predetermined target voltage;

a first driver configured to drive a first transistor element configured as a transistor element which is to be turned on for at least the first period, on the basis of the pulse signal; and a second driver configured to drive a second transistor element configured as a transistor element which is to be turned on only for the second period, on the basis of the pulse signal.

6. The control circuit according to claim 5, further comprising a variable delay circuit configured to apply, to a gate pulse signal to be supplied to the second transistor element, a delay that is adjustable according to a reverse recovery time of the rectifier diode that is actually employed.

7. The control circuit according to claim 1, monolithically integrated on a single semiconductor chip.

8. The control circuit according to claim 7, wherein the switching transistor is monolithically integrated on the control circuit.

9. A step-up DC/DC converter comprising:
an inductor having one end via which an input voltage is to be applied;
a switching transistor arranged between a second end of the inductor and a ground line;
a rectifier diode having an anode connected to the second end of the inductor;
an output capacitor arranged between a cathode of the rectifier diode and the ground line; and
a control circuit according to claim 1, configured to perform switching of the switching transistor.

10. An electronic device comprising the step-up DC/DC converter according to claim 9.

11. A vehicle comprising:
a battery; and
the step-up DC/DC converter according to claim 9, configured to step up a voltage supplied by the battery.

12. A control circuit for a step-up DC/DC converter, wherein the step-up DC/DC converter comprises an inductor, a rectifier diode, an output capacitor, and a switching transistor,
and wherein the switching transistor is configured such that its on resistance is switchable between at least two values,
and wherein the control circuit is configured such that, when the switching transistor is switched from off to on, the control circuit sets the on resistance of the switching transistor to a first value for a first period immediately after the switching of the switching transistor, following which the control circuit sets the on resistance of the switching transistor to a second value that is smaller than the first value for a second period until the switching transistor is turned off, wherein the control circuit is configured to be capable of adjusting the first value according to the capacitance value of the rectifier diode.

13. A control circuit for a step-up DC/DC converter, wherein the step-up DC/DC converter comprises an inductor, a rectifier diode, an output capacitor, and a switching transistor,
and wherein the switching transistor is configured such that its on resistance is switchable between at least two values,
and wherein the control circuit is configured such that, when the switching transistor is switched from off to on, the control circuit sets the on resistance of the switching transistor to a first value for a first period immediately after the switching of the switching transistor, following which the control circuit sets the on resistance of the switching transistor to a second value that is smaller than the first value for a second period until the switching transistor is turned off,
wherein the switching transistor comprises a plurality of transistor elements connected in parallel such that their control terminals are provided independently,
and wherein the on-state transistor element is switched according to switching between the first period and the second period, thereby switching the on resistance of the switching transistor corresponding to a combined resistance of the plurality of switching elements, and wherein the control circuit comprises:
a pulse modulator configured to generate a pulse signal having a duty ratio adjusted such that a feedback voltage that corresponds to an output voltage of the step-up DC/DC converter approaches a predetermined target voltage;
a first driver configured to drive a first transistor element configured as a transistor element which is to be turned on for at least the first period, on the basis of the pulse signal;
a second driver configured to drive a second transistor element configured as a transistor element which is to be turned on only for the second period, on the basis of the pulse signal; and
further comprising a driving adjustment circuit configured to adjust the on resistance of the first transistor element according to the capacitance of the rectifier diode that is actually employed.

14. The control circuit according to claim 13, wherein the driving adjustment circuit is configured to change the amplitude of a gate pulse signal to be supplied to a control terminal of the first transistor element.

15. A control circuit for a step-up DC/DC converter, wherein the step-up DC/DC converter comprises an inductor, a rectifier diode, an output capacitor, and a switching transistor,
and wherein the switching transistor is configured such that its on resistance is switchable between at least two values,
and wherein the control circuit is configured such that, when the switching transistor is switched from off to on, the control circuit sets the on resistance of the switching transistor to a first value for a first period immediately after the switching of the switching transistor, following which the control circuit sets the on resistance of the switching transistor to a second value that is smaller than the first value for a second period until the switching transistor is turned off, wherein the control circuit further comprises a register configured to store data which represents at least one from among a reverse recovery time and the capacitance of the rectifier diode that is actually employed, or otherwise an external setting terminal configured to allow settings to be made for at least one from among the reverse recovery time and the capacitance of the rectifier diode that is actually employed.

16. A control circuit for a step-up DC/DC converter, wherein the step-up DC/DC converter comprises an inductor, a rectifier diode, an output capacitor, and a switching transistor,
and wherein the switching transistor is configured such that its on resistance is switchable between at least two values,
and wherein the control circuit is configured such that, when the switching transistor is switched from off to on, the control circuit sets the on resistance of the switching transistor to a first value for a first period immediately after the switching of the switching transistor, following which the control circuit sets the on resistance of the switching transistor to a second value that is smaller than the first value for a second period until the switching transistor is turned off, further comprising a capacitance detection circuit configured to detect the capacitance $C_{OJ}$ of the rectifier diode by integrating a current that flows when the switching transistor is turned on after the rectifier diode is charged using a predetermined voltage.

17. A control circuit for a step-up DC/DC converter, wherein the step-up DC/DC converter comprises an inductor, a rectifier diode, an output capacitor, and a switching transistor, and wherein the switching transistor is configured such that its on resistance is switchable between at least two values, and wherein the control circuit is configured such that, when the switching transistor is switched from off to on, the control circuit sets the on resistance of the switching transistor to a first value for a first period immediately after the switching of the switching transistor, following which the control circuit sets the on resistance of the switching transistor to a second value that is smaller than the first value for a second period until the switching transistor is turned off, further comprising a time measurement circuit configured to detect a reverse recovery time of the rectifier diode based on a waveform of a current that flows when the switching transistor is turned on after the rectifier diode is charged using a predetermined voltage.

18. A control method for a step-up DC/DC converter, wherein the step-up DC/DC converter comprises:
an inductor;
a rectifier diode;
an output capacitor; and
a switching transistor,
wherein the switching transistor is configured such that its on resistance is switchable between at least two values,
and wherein the control method comprises:

setting an on resistance of the switching transistor to a first value in a first period immediately after the switching transistor is switched from off to on;

setting the on resistance of the switching transistor to a second value that is smaller than the first value for a second period until the switching transistor is turned off after the first period; and setting the first value such that the relation $R/(2\sqrt{(L/C)}) > 1$ is satisfied, with a series resistance component of a loop comprising the output capacitor, the rectifier diode, the switching transistor, and a ground line as R, with a capacitance component of this loop as C, and with a series inductance component of this loop as L.

19. The control method according to claim 18, further comprising setting the first period to a length that is equal to or otherwise greater than a reverse recovery time.

20. A control method for a step-up DC/DC converter, wherein the step-up DC/DC converter comprises:
an inductor;
a rectifier diode;
an output capacitor; and
a switching transistor,
wherein the switching transistor is configured such that its on resistance is switchable between at least two values,
and wherein the control method comprises:

setting an on resistance of the switching transistor to a first value in a first period immediately after the switching transistor is switched from off to on;

setting the on resistance of the switching transistor to a second value that is smaller than the first value for a second period until the switching transistor is turned off after the first period; and setting the first value such that the relation $R/(\pi \times fc \times C)$ is satisfied, with a series resistance component of a loop comprising the output capacitor, the rectifier diode, the switching transistor, and a ground line as R, and with a capacitance component of this loop as C.

* * * * *